United States Patent [19]
Mickey et al.

[11] 3,767,067
[45] Oct. 23, 1973

[54] TRUCK BODY WITH BOTTOM CONVEYOR ASSEMBLY

[75] Inventors: Carl F. Mickey; Lawrence E. Mickey, both of High Point, N.C.

[73] Assignee: W. F. Mickey Body Company, Inc., High Point, N.C.

[22] Filed: Dec. 14, 1971

[21] Appl. No.: 207,769

[52] U.S. Cl............................ 214/83.22, 214/83.3
[51] Int. Cl............................................... B60p 1/36
[58] Field of Search.............. 214/516, 83.22, 83.24, 214/518, 83.3, 83.26, 82, 83

[56] References Cited
UNITED STATES PATENTS

| | | | |
|---|---|---|---|
| 3,572,563 | 3/1971 | Oliver | 214/516 |
| 3,522,919 | 8/1970 | Bader | 214/516 X |
| 3,529,481 | 9/1970 | Budzyn | 214/516 X |
| 3,346,132 | 10/1967 | Duszka | 214/56 |
| 3,250,408 | 5/1966 | Daniluk et al. | 214/83.22 X |

*Primary Examiner*—Albert J. Makay
*Attorney*—Harvey B. Jacobson

[57] ABSTRACT

A truck body having pallet supporting rollers incorporated into the bottom thereof combined with a loading apparatus for receiving loaded pallets in the rear of the truck body and automatically moving them sequentially forward until the body is fully loaded, together with an unloading apparatus for automatically and sequentially moving loaded pallets to the rear of the truck body with a manually operated mechanism being provided for shifting the mechanism from a loading mode to an unloading mode.

9 Claims, 12 Drawing Figures

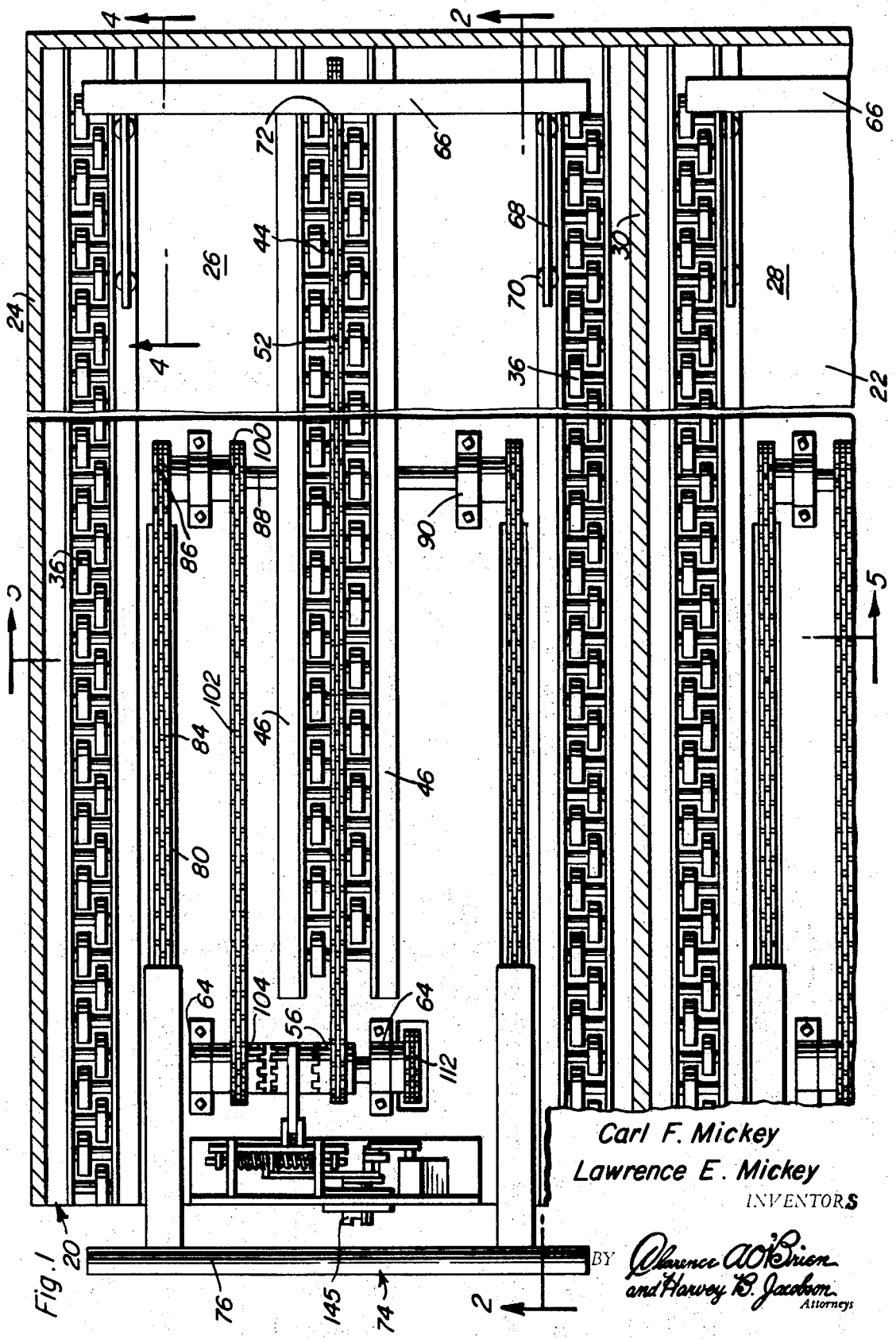

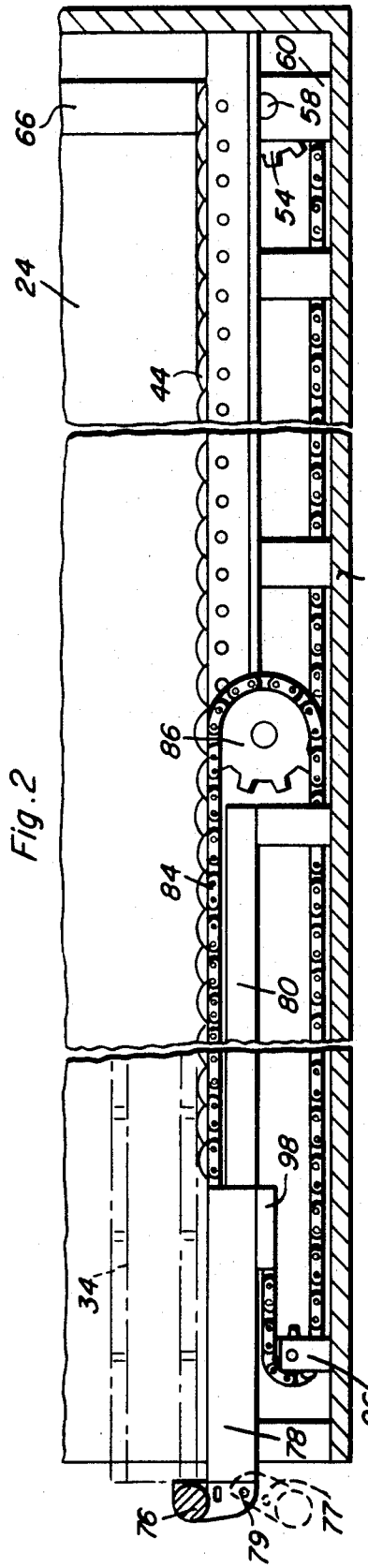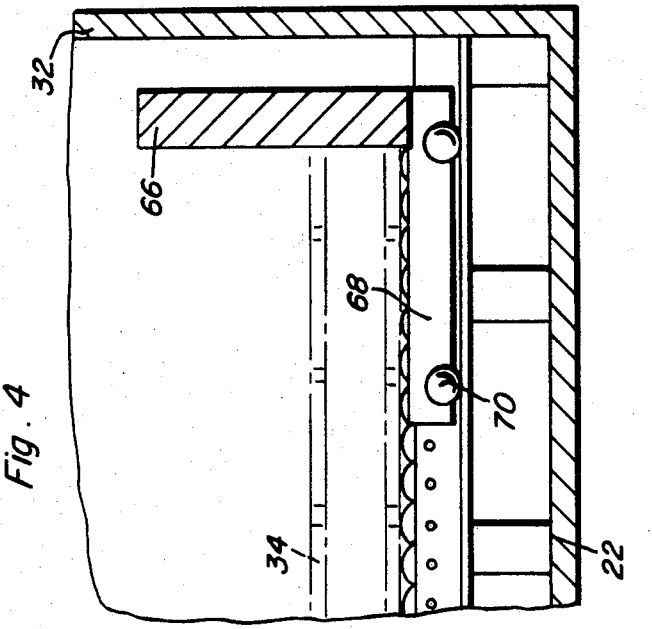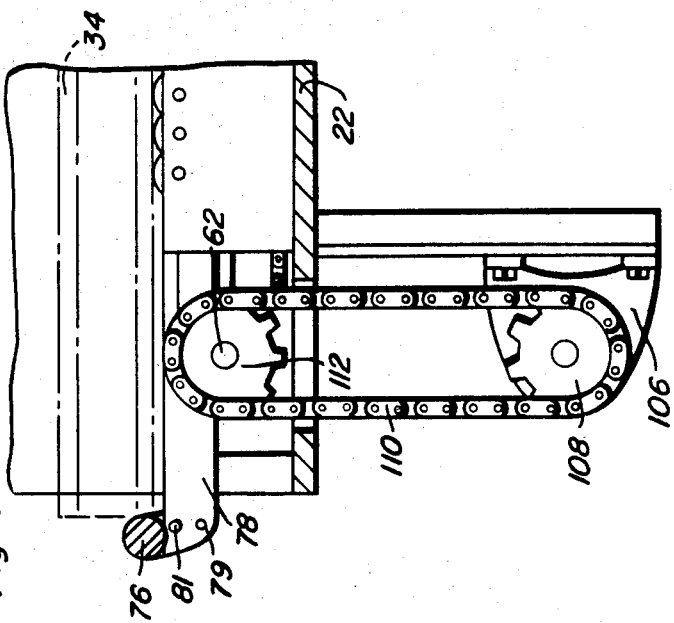

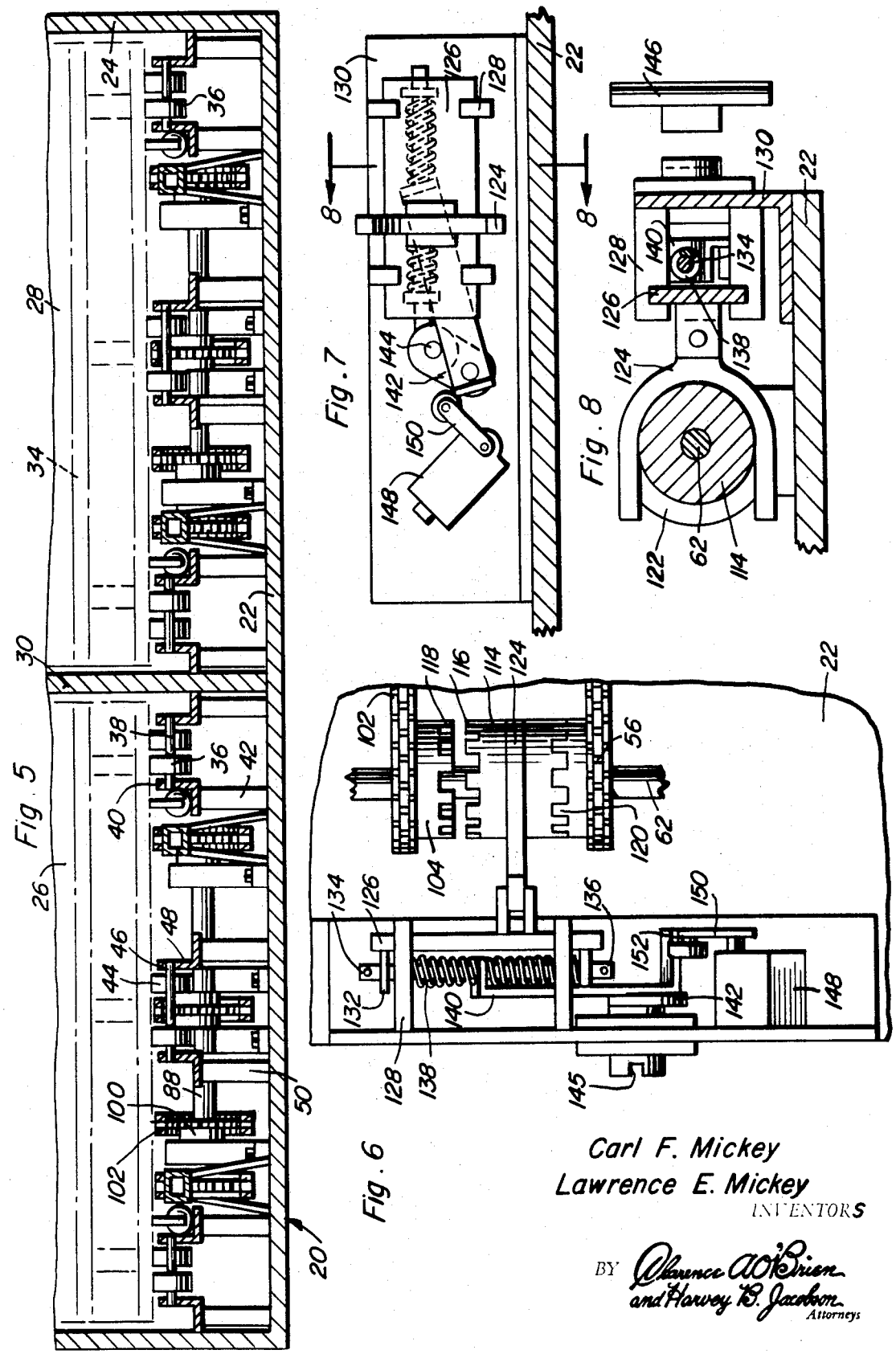

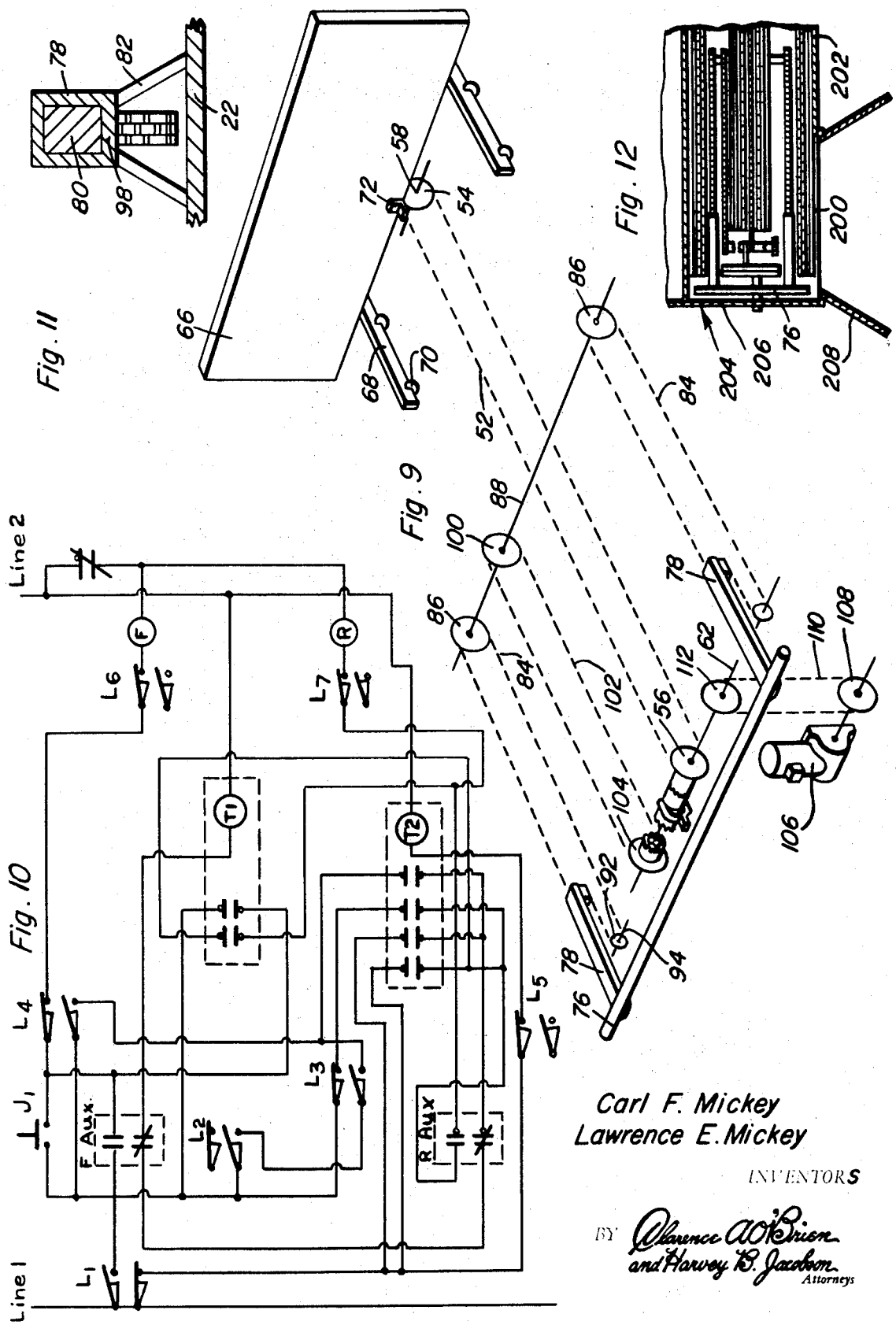

TRUCK BODY WITH BOTTOM CONVEYOR ASSEMBLY

BACKGROUND OF THE INVENTION

1. Field of the Invention

The present invention generally relates to truck bodies and more particularly truck bodies constructed especially for transporting palletized loads, such as beverages, or the like, with the bottom of the truck body incorporating a conveyor assembly with a loading mechanism and unloading mechanism incorporated therein to move pallets longitudinally of the truck body during the loading and unloading operation.

2. Description of the Prior Art

Truck bodies have been provided with many structures to facilitate the loading and unloading of articles or materials. In the beverage industry, the present practice involved is the loading of bottled or canned beverages onto pallets with the pallets being loaded onto a truck body for transport to a destination where the pallets are unloaded from the truck body. To facilitate the loading and unloading of the palletized beverages, low friction conveyors, such as rollers, or the like, have been incorporated into the bottom of the truck body. However, while such devices perform their function, substantial difficulties have been encountered in moving the palletized loads longitudinally of the truck body and maintaining the palletized loads stationarily within the truck body during over-the-road movement.

SUMMARY OF THE INVENTION

An object of the present invention is to provide a truck body with a conveyor assembly in the bottom thereof combined with a loading assembly and an unloading assembly driven in a manner to enable pallets placed into the truck body at one end thereof to be conveyed forwardly during the loading operation and move the pallets rearwardly during the unloading operation.

Another object of the invention is to provide a truck body incorporating a loading and unloading device and including a manually shifting means for selectively conditioning the mechanism for operating in a loading sequence or an unloading sequence.

A further object of the invention is to provide a truck body in accordance with the preceding objects in which the loading and unloading mechanism includes a travelling bulkhead positioned at all times in front of the load, together with a load bar assembly at the rear of the truck body which is moved longitudinally of the truck body to move a loaded pallet into the truck body a distance sufficient to receive another pallet when the load bar mechanism returns to its rearmost position.

Still another object of the invention is to provide a truck body having a loading and unloading mechanism associated therewith adapted to be incorporated into a van-type trailer, such as those employed to transport two longitudinal rows of palletized beverage containers to enable the loaded pallets to be loaded onto the truck body and unloaded from the truck body at the rear end thereof, thereby eliminating the necessity of gaining access to the truck body along the complete length of each side thereof which is necessary when loading conventional trailers or truck bodies of this type which have roll-up doors along each side of the body.

Yet another important feature of the invention is to provide a truck body with a loading and unloading apparatus in accordance with the preceding objects which is relatively simple in construction, dependable and long lasting, adapted to be installed in various types of truck bodies, and relatively inexpensive to manufacture, operate and maintain.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a plan view of a truck body with the loading and unloading apparatus of the present invention incorporated therein;

FIG. 2 is a longitudinal, sectional view taken substantially upon a plane passing along section line 2—2 of FIG. 1 illustrating the structural details of the invention;

FIG. 3 is a detailed sectional view illustrating a portion of the drive mechanism for the loading and unloading apparatus;

FIG. 4 is a detailed sectional view taken substantially upon a plane passing along section line 4—4 of FIG. 1 illustrating the structure of the travelling bulkhead at the forward end of the load in the truck body;

FIG. 5 is a transverse, sectional view taken substantially upon a plane passing along section line 5—5 of FIG. 1 illustrating the relationship of the structural components of the invention;

FIG. 6 is a fragmental plan view illustrating the manually shiftable clutch mechanism for the loading and unloading mechanism;

FIG. 7 is an elevational view observing the shifting mechanism from the forward end thereof;

FIG. 8 is a sectional view taken substantially upon a plane passing along section line 8—8 of FIG. 7 illustrating shifting fork and related mechanism;

FIG. 9 is an exploded perspective schematc view of the loading and unloading mechanism;

FIG. 10 is a schematic wiring diagram illustrating the electrical circuitry for operating the loading and unloading apparatus;

FIG. 11 is a detailed sectional view illustrating the longitudinal rail and tubular runner construction mounted thereon; and FIG. 12 is a fragmental plan view, on a reduced scale, illustrating schematically the manner in which pallets may be loaded from the rear side corner of the truck body.

DESCRIPTION OF THE PREFERRED EMBODIMENT

Referring now specifically to the drawings, the truck body of the present invention is generally designated by the reference numeral 20 and is of conventional construction insofar as the shell, running gear, suspension assembly and related structural components are concerned, with the truck body including a bottom panel or base 22, and upstanding side walls 24 separated into two compartments or longitudinal spaces 26 and 28 by a longitudinal partition 30. The length and width dimensions of the body and the spaces may vary depending upon local regulations and individual requirements.

The front of the truck body 20 is provided with a front wall 32 and the rear thereof may be provided with a suitable closure door or closure doors, the details of which are not shown. Inasmuch as the structure on each side of the partition 30 is identical insofar as the loading and unloading mechanism is concerned, only one loading and unloading mechanism will be described in detail with it being understood that both compartments or spaces 26 and 28 are likewise equipped. The loading and unloading apparatus is adapted to load and unload palletized loads 34 in which the pallets on which the articles are placed are of conventional construction and are handled by suitable load handling equipment, such as a fork truck or the like.

Disposed adjacent each side edge of the compartment 26 is a plurality of rollers 36 which are disposed in staggered relation, as illustrated in FIG. 1, with each roller 36 being journaled by a suitable supporting axle 38 supported by longitudinal support rails 40 supported from the base or bottom panel 22 by supporting brackets 42. Similar staggered supporting rollers 44 are provided centrally of the space 26 and are supported by similar axles 46 supported by rail 48 and supported by brackets 50 with the aligned rollers 44 being spaced apart further than the rollers 36 and receiving an elongated endless chain 52 therebetween, as illustrated in FIG. 5, with the upper run of the chain being disposed slightly below the top peripheral surfaces of the rollers 44. The lower run of the chain 52 is disposed below the rollers and between the brackets 50. The forward end of the chain 52 which is in the form of a sprocket chain is entrained around a forward sprocket gear 54 while the rear end of the sprocket chain 52 is entrained around a sprocket gear 56. The forward sprocket gear is connected to a supporting axle 58 supported by suitable brackets 60 while the rear sprocket gear 56 is journaled on a drive shaft 62 supported by suitable brackets or bearing blocks 64.

With this construction, the rollers 36 and 44 form a low friction conveyor surface for movably supporting the pallets 34 for longitudinal movement in the space 26 with the pallets having one dimension generally equal to the width of the space or compartment 26 with some space being provided between the side walls 24 and the partition 30 to enable an operator of a fork lift truck to readily position loaded pallets into the rear of the space 26 and remove loaded pallets therefrom.

Supported from the inner rails 40 which are L-shaped in configuration is a travelling forward bulkhead or wall 66 which has a pair of rearwardly extending members 68 on the bottom edge thereof supporting a pair of rollers 70 which are rollingly engaged with the horizontal flanges on the innermost rails 40, as illustrated in FIG. 5. The bulkhead 66 is attached to the sprocket chain 52 for movement therewith as indicated at 72 with this connection being a suitable detachable connection which may be in the form of a bolt-type fastener or a depending pin arrangement which may be detachably engaged with the sprocket chain 52 which may be in the form of a conventional roller chain or the like. The rollers 70 which support the longitudinal members 68 which in turn support the bulkhead 66 may be in the form of spherical rollers which have the bottom peripheral surface engaging the horizontal flange of each inner rail 40 and the inner surface thereof engaging the vertical flange of the inner rail 40 for guiding reciprocatory movement of the travelling bulkhead 66 in relation to the truck body for unloading the pallets 34 in a manner described hereinafter.

The rear of the space 26 is provided with a loading mechanism generally designated by numeral 74 which includes a transversely extending loading bar 76 attached to a pair of forwardly extending tubular supporting members 78 that are longitudinally slidably mounted on a pair of horizontally extending guide rails 80 supported from the base by downwardly diverging brackets 82, as illustrated in FIG. 12. The forward ends of the tubular support members 78 are connected to one end of a sprocket roller chain 84 which extends along the top surface of the guide rail 80 and is entrained over a sprocket gear 86 fixed to a shaft 88 journaled in bearing blocks 90 with the chain 84 then extending rearwardly along the floor surface 22 and around an idler sprocket gear 92 journaled by a shaft 94 supported by brackets 96 with the terminal end of the chain then extending forwardly and being connected to the depending projection 98 on the forward bottom end of the tubular supports 78. As illustrated, two tubular supports 78 are provided with each of them being identical in construction and associated with a chain 84 in the same manner. The chains 84 are driven by a sprocket gear 100 rigid with the shaft 88 with the sprocket gear 100 being driven by a sprocket chain 102 entrained over a sprocket gear 104 journaled on the shaft 62. Thus, as the chains 84 are driven in reverse directions, the loading bar 76 along with the tubular supporting members 78 will be reciprocated longitudinally of the guide rails 80 a distance to move a pallet 34 placed inwardly of the loading bar 76 a distance forwardly to enable another pallet to be placed inwardly of the loading bar when the loading bar has returned to its rearmost position, thereby moving the pallets forwardly in increments approximately equal to the length of the pallet with the pallets being abutted against each other as the loading bar moves forwardly thus causing all of the pallets in the truck body to move forwardly and the bulkhead also to move forwardly until the space 26 is completely loaded.

To drive the shaft 62, a reversible gear head type motor 106 is provided with an output sprocket gear 108 driving a sprocket chain 110 extending upwardly and entrained over a sprocket gear 112 affixed to the shaft 62.

For selectively driving the chain 52 for moving the travelling bulkhead 66 or the chain 102 for moving the load bar 76 and supports 78, an axially shiftable clutch member 114 is splined or keyed to the shaft 62 for reciprocation thereon. Each end of the clutch member 114 is provided with teeth 116 for engagement with corresponding teeth 118 on the sprocket gear 104 or teeth 120 on the sprocket gear 56 so that in one shifted position of the clutch 114, power from the shaft 62 will be transmitted to the clutch member 114 to the sprocket gear 56 and in the other position of the clutch 114, power will be transmitted to the sprocket gear 104. Any suitable type of clutch mechanism or clutch faces may be employed as long as a positive driving connection is provided selectively between the clutch 114 and the respective sprocket gears 56 and 104.

The periphery of the clutch member 114 is provided with a groove 122 receiving the bifurcated end of a shifting fork 124 that is moved in a direction parallel to the shaft 62 for shifting the clutch member 114. The fork 124 is attached to a bar 126 that is substantially perpendicular to the fork and parallel to the shaft 62. The bar 126 is longitudinally slidably supported in bracket members 128 supported from an L-shaped bracket 130. The ends of the bar 126 are provided with inturned lugs 132 received on a rod 134, which have transverse retaining pins 136 at each end thereof and which receives a shifting spring 138 thereon which has a spring loading shifting bar 140 and is connected centrally thereto so that when the shifting bar 140 is longitudinally reciprocated, the spring 138 will be compressed between the bar 140 and the opposed lug 132 thereby exerting spring pressure on the slide member 126 for biasing the clutch yoke 124 thereby shifting the position of the clutch 114, This construction enables spring pressure to be exerted on the clutch member 114 so that the teeth thereon can become aligned properly with the teeth on its mating sprocket gear.

The spring loading shifting bar 140 is attached pivotally to one end of an eccentric arm 142 rigid with a shaft 144 which extends through the vertical mounting plate 130 and includes a slot 145 in the end thereof for receiving the blade end of a T-shaped operating handle 146 on the outer end thereof so that when the shaft 144 is pivoted, the eccentric arm 142 will cause longitudinal shifting movement of the point of connection between the shifting bar 140 and the spring 138. Suitable indicia may be provided in association with the slotted end of the shaft 144 and the adjacent frame structure to indicate whether the mechanism is in the load or unload phase. The handle 146 could be welded or otherwise fixed to the end of shaft 144 but the separate handle prevents the operator from shifting the mechanism from one phase to another while the unit is in operation. Also, mounted on the vertical plate 130 is a limit switch 148 having a limit switch arm 150 in the path of movement of a projection 152 on the shifting bar 140.

With this construction, the drive motor 106 will selectively drive the forward wall or bulkhead or the load bar 76 depending upon the manually shifted position of the operating handle 146. Thus, the loading bar 76 may be employed to move a pallet 34 inwardly on the supporting rollers a distance sufficient to enable placement of another pallet onto the rollers when the loading bar has been returned to its rearmost position. To move the pallets rearwardly from the front of the truck body, the travelling bulkhead is moved rearwardly as the pallets are removed from in front of the loading bar 76 which limits rearward movement of the pallets. In some instances, it may be desirable to unload the pallets onto another conveyor aligned with the supporting rollers in which event, the loading bar may be pivoted downwardly to the dotted line position illustrated in FIG. 2, which is accomplished by the loading bar 76 having depending brackets 77 attached pivotally to the lower bottom corners of the tubular support 78 by a pivot pin or bolt 79 and a removable fastener 81 extending through matching apertures in the tubular support 78 and the bracket 77 thereby enabling the loading bar 76 to be pivoted downwardly so that pallets 34 may be loaded onto or off of the supporting rollers when the supporting rollers are aligned with another conveying apparatus or loading apparatus which is capable of moving the pallets onto the truck body or removing pallets therefrom.

The loading and unloading operation of the loading bar and travelling bulkhead, respectively, are automatic and controlled by switches positioned for actuation and response to presence of, absence of or position of the pallets, and while the specific electrical circuitry itself does not form a significant part of the invention, the automatic operation thereof is significant and, accordingly, a description of the schematic circuit illustrated in FIG. 10 insofar as operation during the load sequence and unload sequence is included.

In the load sequence, the handle 146 of the clutch is shifted to the load position which mechanically engages the clutch 114 with the sprocket gear 104 and at the same time positions limit switch 148, designated L-1 in FIG. 10, which is shown in the unload position.

A push button jog switch J-1 will automatically position load bar in start position for loading. Switch L-2 is pallet on start load cycle; switch L-3 is stop reverse load slide — start forward load slide; switch L-4 is stop forward load slide — start reverse load slide; switch L-5 is unload limit; switch L-6 is extreme load limit; switch L-7 is extreme unload limit. The timer T-1 gives motor time to stop before reversing and timer T-2 permits unload travel to continue to a point 5 inches outside rear of trailer from cut-off limit L-5 inside trailer.

FIG. 12 is a small plan view illustrating an embodiment of the invention in which the pallets are inserted and removed from an opening 200 in the side wall 202 of a truck body generally designated by the numeral 204 which has a solid rear end wall 206. In this construction, the opening 200 is illustrated as being provided with pivotal closure doors 208 with it being pointed out that any type of closure door or closure device may be employed for the opening. Operation of the device is the same as that described previously in which the pallets are loaded and unloaded by the load bar 76 and the travelling bulkhead (not shown in FIG. 12). The partition wall may be provided with an adjustment feature so the effective thickness thereof may be varied to enable pallets of different widths to be received in the load receiving spaces so that the pallets are incapable of lateral shifting during over-the-road movement of the truck body. Also, while the device has been illustrated in combination with a truck body, it may also be employed in any suitable type of load carrying body receiving various types of loads mounted on pallets or equivalent load carrying platforms.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. In an elongated load carrying body having a low friction conveyor means in the bottom thereof for supporting a plurality of load units for longitudinal movement in relation to the body, a loading and unloading assembly associated with said body for moving the load unit longitudinally thereof while supported by the conveyor means, said loading and unloading assembly comprising a longitudinally travelling bulkhead supported from said body, a longitudinally travelling load bar at one end of the body and supported therefrom for reciprocation, endless chain means drivingly connected to the load bar for drivingly reciprocating the load bar in both directions a distance at least equal to the length of a load unit to enable load units to be positioned on the conveyor means inwardly of the load bar for movement into the load body during a loading operation, drive means fixedly connected with the bulkhead for moving the bulkhead longitudinally toward the loading bar when actuated for unloading load units, a single power means for driving the bulkhead and load bar, and manually operated means selectively connecting the drive means for the load bar and bulkhead to the power means for operating the assembly in a loading mode or unloading mode, said manually operated means preventing simultaneous actuation of the load bar and bulkhead.

2. The structure as defined in claim 1 wherein said loading bar includes a pair of support members extending longitudinally of the body, a pair of rigid guide rails engaging and supporting said support members for supporting and guiding the load bar during longitudinal reciprocation.

3. The structure as defined in claim 1 wherein said bulkhead includes a vertically upstanding and transversely extending member, supporting roller means carried by said bulkhead for engaging the body and rollingly supporting the bulkhead in relation thereto.

4. The structure as defined in claim 1 wherein said means driving the bulkhead includes an elongated chain supported from the body and including an elongated upper run disposed under the bulkhead and being fixedly attached thereto whereby movement of the chain in either direction will cause longitudinal movement of the bulkhead.

5. The structure as defined in claim 1 wherein said means for selectively controlling driving actuation of the bulkhead and load bar including a manually shiftable clutch mechanism for selective engagement with the drive connection with the load bar and bulkhead, reversible motor means drivingly connected with the clutch for selectively driving the load bar and bulkhead.

6. The structure as defined in claim 1 wherein said load body is in the form of a van trailer having two longitudinal compartments therein separated by a partition with each compartment having a conveyor means and a loading and unloading assembly therein, said load units being in the form of palletized beverage containers to enable loading and unloading of the body from one end thereof thereby eliminating the necessity of obtaining access throughout the opposed side walls of the body.

7. The structure as defined in claim 6 wherein said conveyor means is in the form of a plurality of longitudinal rows of rotatably rollers supporting the load units at transversely spaced points, said rollers being freely rotatable for enabling movement of the load units thereon when forces are exerted on the load units.

8. The structure as defined in claim 7 wherein said loading bar includes a pair of support members extending longitudinally of the body, a pair of rigid guide rails engaging and supporting said support members for supporting and guiding the load bar during longitudinal reciprocation, said bulkhead including a vertically upstanding and transversely extending member, supporting roller means carried by said bulkhead for engaging the body and rollingly supporting the bulkhead in relation thereto, said means driving the bulkhead including an elongated chain supported from the body and including an elongated upper run disposed under the bulkhead and being fixedly attached thereto whereby movement of the chain in either direction will cause longitudinal movement of the bulkhead, said means driving the bulkhead being rendered inoperative when the load bar is being reciprocated.

9. A load unit handling device in combination with a load body of a vehicle in which the body includes a low-friction, roller equipped bed continuously supporting the load units, an elongated drive member supported in close proximity to said bed and being movable along a reversible, predetermined path along said bed, said path terminating adjacent forward and rearward extremities of the bed, an unloading member connected to said elongated drive member for movement continuously therewith, a shorter drive member supported in close proximity to said bed and being movable along a reversible, predetermined path along said bed, said path of the shorter drive member terminating at one end at the rearward end of the bed rearwardly of the path of the elongated drive member and at the other end a distance forwardly of the rearward end of the bed substantially equal to the fore-to-aft dimension of a load unit, a loading unit disposed above the bed and connected with said shorter drive member for movement continuously therewith, a single reversible power means supported adjacent the bed, and means connecting the power means to said drive members, said connecting means including a shiftable means to actuate only one of said drive members at a time for loading and unloading a plurality of load units from the rearward end of the bed.

* * * * *